(12) United States Patent
Kim et al.

(10) Patent No.: US 6,844,939 B1
(45) Date of Patent: Jan. 18, 2005

(54) DEVICE FOR TRANSMISSION/RECEPTION OF FACSIMILE DATA IN WIRELESS LOCAL LOOP (WLL) SYSTEM

(75) Inventors: Sun Gil Kim, Kyonggi-do (KR); Sung Chul Yang, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/552,562

(22) Filed: Apr. 19, 2000

(30) Foreign Application Priority Data

Apr. 20, 1999 (KR) ......................................... 1999-14076

(51) Int. Cl.[7] .............................................. G06F 15/00
(52) U.S. Cl. ...................... 358/1.15; 358/400; 358/404; 358/434; 358/442
(58) Field of Search ................................ 455/557, 414, 455/555, 450, 426, 424, 423; 358/1.15, 462, 442, 444

(56) References Cited

U.S. PATENT DOCUMENTS

| | | | | | |
|---|---|---|---|---|---|
| 4,910,610 A | * | 3/1990 | Utsugi | ......................... | 358/435 |
| 4,964,154 A | * | 10/1990 | Shimotono | ............. | 379/100.15 |
| 5,450,472 A | * | 9/1995 | Brax | ........................... | 455/557 |
| 5,491,565 A | * | 2/1996 | Naper | ......................... | 358/434 |
| 5,752,199 A | * | 5/1998 | Scott | .......................... | 455/557 |
| 5,819,177 A | * | 10/1998 | Vucetic et al. | ............... | 455/425 |
| 5,883,723 A | * | 3/1999 | Sakata | ........................ | 358/442 |
| 5,884,190 A | * | 3/1999 | Lintula et al. | ............... | 455/557 |
| 5,953,647 A | * | 9/1999 | Patel et al. | ............... | 455/426.2 |
| 5,953,675 A | * | 9/1999 | Rabina et al. | ............... | 455/557 |
| 5,956,651 A | * | 9/1999 | Willkie et al. | ........... | 455/553.1 |
| 5,963,860 A | * | 10/1999 | Muths et al. | ............. | 455/412.1 |
| 5,966,669 A | * | 10/1999 | Kenmochi et al. | .......... | 455/557 |
| 6,038,037 A | * | 3/2000 | Leung et al. | ................ | 358/434 |
| 6,052,409 A | * | 4/2000 | Quirk et al. | ................. | 375/220 |
| 6,057,943 A | * | 5/2000 | Kweon et al. | .............. | 358/435 |
| 6,124,949 A | * | 9/2000 | West et al. | .................. | 358/434 |
| 6,157,846 A | * | 12/2000 | Manning et al. | ............ | 455/557 |
| 6,292,509 B1 | * | 9/2001 | Fujino | ......................... | 375/222 |
| 6,304,560 B1 | * | 10/2001 | Archambaud et al. | ...... | 370/324 |
| 6,324,384 B1 | * | 11/2001 | Nobuyasu et al. | ......... | 455/74.1 |
| 6,480,483 B2 | * | 11/2002 | Yahata et al. | ................ | 370/350 |
| 6,549,543 B1 | * | 4/2003 | Shin | ........................... | 370/474 |
| 6,571,109 B1 | * | 5/2003 | Kim | ........................... | 455/555 |
| 6,628,414 B1 | * | 9/2003 | Gabrielsen et al. | ......... | 358/1.15 |

* cited by examiner

*Primary Examiner*—Kimberly Williams
*Assistant Examiner*—Tia Carter
(74) *Attorney, Agent, or Firm*—Fleshner & Kim, LLP

(57) ABSTRACT

A device for transmission/reception of a facsimile data in a separate type WLL system is provided, in which an analog G3 facsimile signal is converted into a CDMA signal format for transmission/reception of the signal. The device includes an interface unit for transmitting facsimile data produced at a facsimile, or matching data received in an analog facsimile protocol to wire line characteristics for providing the data to the facsimile, a facsimile signal processor for receiving the facsimile data from the interface unit and converting it into a digital signal and a radio data service format, or receiving a data in a radio data service format, converting it into an analog facsimile protocol, and forwarding it to the interface unit. It also includes a CDMA signal processor for receiving the converted facsimile data from the facsimile signal processor and converting it into a CDMA format, or receiving data in a CDMA format, converting into the radio data format, and forwarding it to the facsimile signal processor. It also includes a frequency modulation/demodulation unit for frequency modulating the CDMA formatted facsimile data, or receiving and demodulating an external radio signal, and forwarding it to the CDMA signal processor.

35 Claims, 2 Drawing Sheets

DEVICE FOR TRANSMISSION/RECEPTION OF FACSIMILE DATA IN WIRELESS LOCAL LOOP (WLL) SYSTEM

BACKGROUND OF THE INVENTION

1. Field of the Invention

The present invention relates to transmission/reception of a facsimile data in a Wireless Local Loop (WLL) system, and more particularly, to a device for transmission/reception of a facsimile data in a WLL system, in which an analog G3 facsimile signal is converted into a CDMA signal format for transmission/reception of the signal.

2. Background of the Related Art

In general, a Wireless Local Loop (WLL) system provides a wireless subscriber line between a switching center and homes or offices, for providing speech, facsimile, and data communication services. Full scale development of the WLL started as problems of frequency efficiency, radio channel quality, build up cost per a subscriber are solved when the semiconductor and radio communication technologies developed in 1980s are combined with the radio frequency technology developed in 1970s.

Unlike a conventional wire network, the WLL system has the advantages of low build up cost and time, and low maintenance costs, while still providing a variety of services, such as excellent communication quality, data, and Integrated Service Digital Network (ISDN) capabilities, and the like. Thus, the WLL system can be used where a new communication service provider intends to secure a subscriber network quickly, or used as a communication infrastructure of a developing country which has a poor wire communication network.

The WLL system is typically provided with telephone sets and a Network Interface Unit (NIU), which makes radio communication between the telephone sets and a switchboard possible. There are two types of WLL systems: the separate type WLL system and the integrated type WLL system. The separate WLL system is provided with a subscriber connector for wire connection to a stationary telephone so that the subscriber who has the stationary telephone set connected to an existing wire network can buy only the subscriber connector and not a telephone set when the subscriber subscribes to the WLL system. The integrated WLL system, on the other hand, is provided with the telephone set and the subscriber connector integrated in hardware for the convenience of the subscriber who has, for example, no stationary telephone set in subscription to the WLL system.

A related art Code Division Multiple Access (CDMA) WLL has a digital facsimile (class 2, 2.0) function for using a personal computer, with the personal computer connected to the NIU. However, since a group 3 (called G3 hereafter) facsimile signal is transmitted on a CDMA audio channel, a normal transmission/reception of the G3 facsimile is difficult. That is, the G3 facsimile transmission, which is a facsimile device using a PSTN for transmission of an A4 size document within approximately one minute by compressing a number of bits to ⅒, has a problem when it is intended to transmit the facsimile data by using PCS or DCN in that normal facsimile data transmission/reception is extremely difficult because of distortion of the facsimile signal coming from difference between the PSTN and PCS or DCN transmission systems.

The above references are incorporated by reference herein where appropriate for appropriate teachings of additional or alternative details, features and/or technical background.

SUMMARY OF THE INVENTION

An object of the present invention is to overcome, in whole or in parts, one or more of the problems due to limitations and disadvantages of the related art.

Another object of the present invention is to provide a device for transmission/reception of a facsimile data in a WLL system, which permits facsimile data transmission and reception by using G3 facsimile device in a separate type WLL.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for transmission/reception of a facsimile data in a separate type WLL system, includes an interface unit for transmitting a facsimile data produced at a facsimile or matching a data received in an analog facsimile protocol to wire line characteristics for providing the data to the facsimile, a facsimile signal processor for receiving the facsimile data from the interface unit, and converting into a digital signal and a radio data service format, or receiving a data in a radio data service format, converting into an analog facsimile protocol, and forwarding to the interface unit, a CDMA signal processor for receiving the facsimile data converted into the radio data service format from the facsimile signal processor and converting into a CDMA format, or receiving a data in a CDMA format, converting into the radio data format, and forwarding to the facsimile signal processor, and a frequency modulation/demodulation unit for frequency modulating the facsimile data converted into the CDMA format at the CDMA signal processor to forward in a radio signal, or receiving and demodulating an external radio signal, and forwarding to the CDMA signal processor.

In other aspect of the present invention, there is provided a device for transmission/reception of a facsimile data in a WLL system including an interface unit for transmitting the facsimile data generated at a facsimile, or matching a data received in a facsimile protocol to wire line characteristics for providing the data to the facsimile, a first CODEC unit for converting a facsimile data signal from the interface unit into a digital signal, or converting a digital signal into the analog facsimile data signal, and forwarding to the interface unit, a second CODEC for converting a signal converted into the digital signal at the first CODEC unit into an analog signal, or converting an analog signal into a digital signal and forwarding to the first CODEC unit, a facsimile signal processor for receiving the analog facsimile data from the second CODEC, converting into a digital signal and a radio data service format and forwarding the converted signal, or receiving a data in a radio data service format, converting into an analog facsimile protocol, and forwarding to the second CODEC, a CDMA signal processor for receiving the facsimile data converted into the radio data service format from the facsimile signal processor and converting into a CDMA format, or receiving a data in a CDMA format, converting into the radio data service format, and forwarding to the facsimile signal processor, and a modulation/demodulation unit for frequency modulating the facsimile data converted into a CDMA format at the CDMA signal processor to forward in a radio signal, or receiving and demodulating an external radio signal, and forwarding to the CDMA signal processor.

The interface unit includes a jack for connecting the facsimile and an NIU, a ring generator for generating a ring signal if received at the facsimile, a detector for detecting and forwarding the facsimile data transmitted from the facsimile, and an Subscriber Line Integrated Circuit (SLIC) for receiving a signal detected at the detector, matching line characteristics for transmission of the analog facsimile data generated at the facsimile, and transmitting the analog facsimile data to the facsimile signal processor.

The facsimile signal processor includes a DTMF receiver for receiving a Dual Tone Multi-Frequency (DTMF) generated at the facsimile, a first amplifier for amplifying and forwarding the analog facsimile signal from the interface unit, a modem for modulating and forwarding the analog facsimile signal amplified at the first amplifier, or demodulating and forwarding a modulated facsimile signal, a second amplifier for amplifying the analog facsimile signal demodulated at the modem, and forwarding to the interface unit, a first memory having a radio data service format (protocol, class 2, 2.0) used in a CDMA system and an analog facsimile protocol stored therein, a second memory for buffering the analog facsimile data signal and the radio data service format signal, and a controller for converting the analog facsimile signal demodulated at the modem into the radio data digital facsimile signal format used in a CDMA system, or converting the data converted into a radio data service format into the analog facsimile signal from the CDMA signal processor, both by using the first and the second memories, and forwarding to the modem.

In order to achieve at least the above-described objects of the present invention in a whole or in parts, there is provided a device for transmission/reception of facsimile data in a Wireless Local Loop (WLL) system that includes an interface unit, which transmits facsimile data produced at a facsimile or matches data received in an analog facsimile protocol to wire line characteristics to provide the data to the facsimile, a facsimile signal processor, which receives the facsimile data from the interface unit, and converts the facsimile data into a digital signal with a radio data service format, or receives data in a radio data service format and converts it into an analog facsimile protocol to forward to the interface unit, a CDMA signal processor, which receives the radio data service formatted facsimile data from the facsimile signal processor and converts it into CDMA format, or receives data in CDMA format, converts it into the radio data format and forwards it to the facsimile signal processor, and a frequency modulation/demodulation unit, which frequency modulates the CDMA formatted facsimile data to forward as a radio signal, or receives and demodulates an external radio signal, and forwards the received signal to the CDMA signal processor.

To further achieve the above-described objects of the present invention in a whole or in parts, there is provided a device for transmission/reception of a facsimile data in a Wireless Local Loop (WLL) system that includes an interface unit, which transmits facsimile data generated at a facsimile, or matches data received in a facsimile protocol to wire line characteristics to provide to the facsimile, a first CODEC unit, which converts a facsimile data signal from the interface unit into a digital signal, or converts a received digital signal into an analog facsimile data signal to forward to the interface unit, a second CODEC unit, which converts the digital signal from the first CODEC unit into an analog signal, or converts an analog facsimile protocol signal into the received digital signal to forward to the first CODEC unit, a facsimile signal processor, which receives the analog signal from the second CODEC unit and converts it into a digital signal having a radio data service format, or which receives data in a radio data service format, converts it into the analog facsimile protocol signal, and forwards it to the second CODEC unit, a CDMA signal processor, which receives the digital signal having the radio data service format from the facsimile signal processor and converts it into a CDMA format, or which receives data in a CDMA format, converts it into the radio data service format, and forwards it to the facsimile signal processor, and a modulation/demodulation unit, which modulates the CDMA formatted signal received from the CDMA signal processor, or which receives and demodulates an external radio signal to forward to the CDMA signal processor.

To further achieve the above-described objects of the present invention in a whole or in parts, there is provided a signal processing device that includes an interface unit to couple with at least one input device and detect and receive a device signal or output a device signal, a signal processor coupled to receive an interface signal and convert a data format of the signal or provide an interface signal to the interface unit, a Code Division Multiple Access (CDMA) signal processor coupled to receive a processed signal from the signal processor and generate a CDMA formatted signal.

To further achieve the above-described objects of the present invention in a whole or in parts, there is provided a method for transmitting facsimile data that includes detecting analog facsimile data from a facsimile, providing a detection signal to a controller and a Subscriber Line Integrated Circuit (SLIC), matching line characteristics and the SLIC according to the detection signal, transmitting the analog facsimile signal to a modem through a first amplifier, modulating the analog facsimile signal and forwarding it to the controller, converting the analog facsimile signal to a digital signal using a prescribed protocol, forwarding the digital signal to a CDMA signal processor, converting the digital signal into a CDMA protocol, and modulating the CDMA protocol digital signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
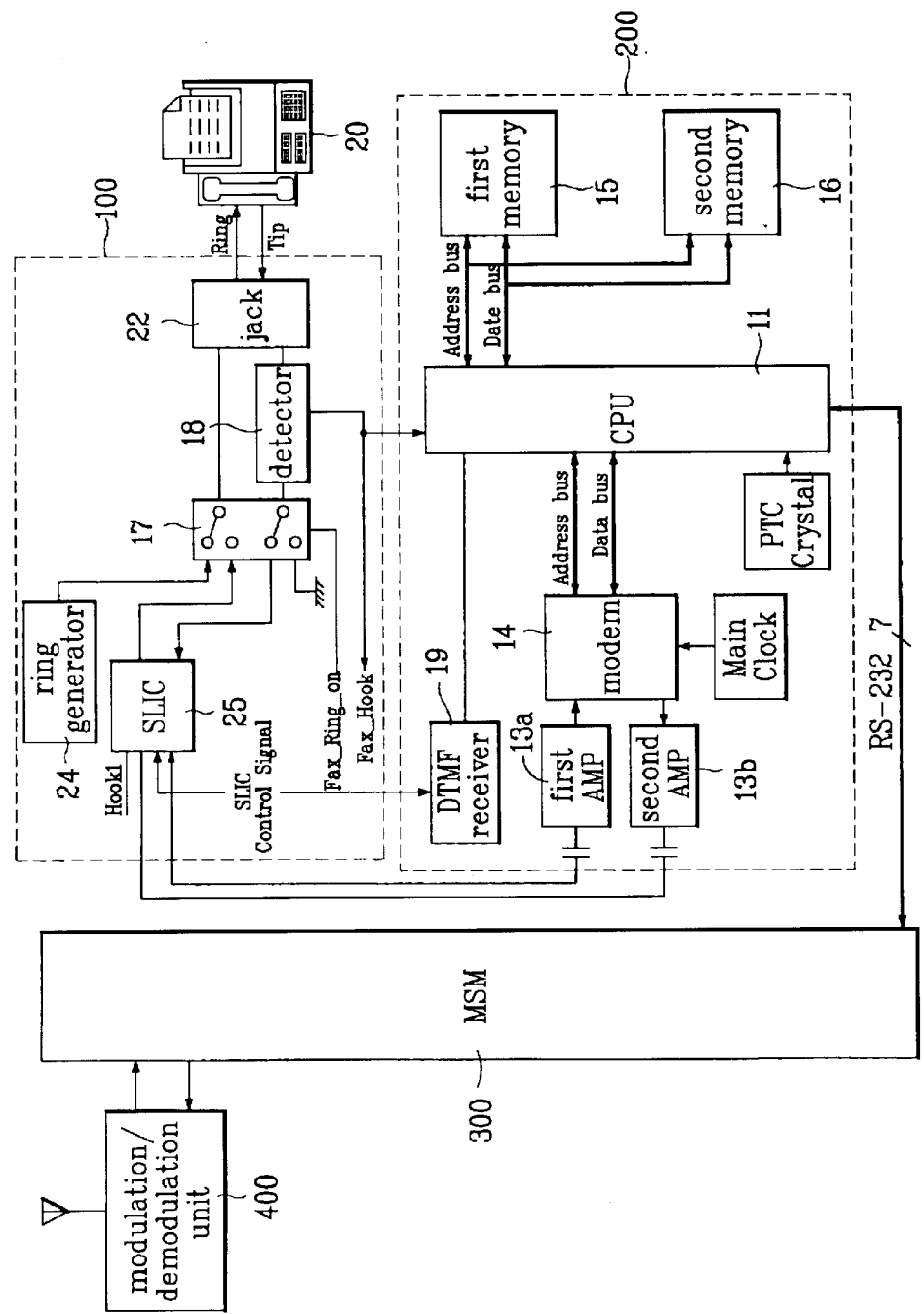
FIG. 1 is a drawing which illustrates a block diagram of a device for transmission/reception of a facsimile data in a WLL system in accordance with a first preferred embodiment of the present invention; and, FIG. 2 is a drawing which illustrates a block diagram of a device for transmission/reception of a facsimile data in a WLL system in accordance with a second preferred embodiment of the present invention.

Referring to FIG. 1, the device for transmission/reception of a facsimile data in a WLL system in accordance with a first preferred embodiment of the present invention preferably includes a facsimile unit 20 used, for example, in a home or an office, and an interface unit 100 for transmitting facsimile data produced at the facsimile 20, or matching data received in an analog facsimile protocol to wire line characteristics for transmission to the facsimile 20. The system further includes a facsimile signal processor 200 for receiving the facsimile data from the interface unit 100 and converting it into a digital signal and a radio data service format (for example, converting an analog facsimile data protocol into a facsimile service protocol (class 2, 2.0) used in a CDMA system), or receiving data in a radio data service format, converting it into an analog facsimile protocol, and forwarding it to the interface unit 100.

Next, a CDMA signal processor 300, for example, a mobile station modem, is provided for receiving the facsimile data converted into the radio data service format from the facsimile signal processor 200 and converting it into a CDMA format, or receiving data in CDMA format, converting it into the radio data format, and forwarding it to the facsimile signal processor. The system also includes a frequency modulation/demodulation unit 400 for frequency modulating facsimile data converted into CDMA format at the CDMA signal processor 300, to forward it as a radio signal, or receiving and demodulating an external radio signal, and forwarding it to the CDMA signal processor 300.

The interface unit 100 includes a jack 22 for connecting the facsimile 20 and an NIU, a ring generator 24 for generating a ring signal if a call is received at the facsimile 20, and a detector 18 for detecting facsimile data transmitted from the facsimile 20. It further includes a Subscriber Line Integrated Circuit (SLIC) 25 for receiving a signal detected at the detector 18, matching line characteristics, and transmitting the analog facsimile data produced at the facsimile 20 to the facsimile signal processor 200.

The facsimile signal processor 200 includes a DTMF receiver 19 for receiving a Dual Tone Multi-Frequency (DTMF) signal generated at the facsimile 20, a first amplifier 13a for amplifying and forwarding the analog facsimile signal from the interface unit 100, and a modem 14 for modulating and forwarding the analog facsimile signal amplified at the first amplifier 13a, or demodulating and forwarding a modulated facsimile signal. It further includes a second amplifier 13b for amplifying the analog facsimile signal demodulated at the modem 14 and forwarding it to the interface unit 100, and a first memory 15 having a radio data service format (protocol, class 2, 2.0) used in a CDMA system and an analog facsimile protocol stored therein. A second memory 16 buffers the analog facsimile data signal and the CDMA digital facsimile data format signal. A controller 11 converts the analog facsimile signal demodulated at the modem into the radio data digital facsimile signal format (class 2, 2.0) used in a CDMA system, or converts the data converted into a digital facsimile signal format into the analog facsimile signal, both by using the first and the second memories 15 and 16. It then forwards the result to the interface unit 100 through the modem 14 and the second amplifier 13b. Switch 17 is also included.

The operation of the device for transmission/reception of a facsimile data in a WLL in accordance with a first preferred embodiment of the present invention will now be described.

When the facsimile 20 transmits facsimile data, the detector 18 detects the facsimile data and provides a detection signal to the controller 11 and the SLIC 25. The SLIC 25 matches line characteristics according to the detection signal from the detector 18 to transmit the facsimile data generated at the facsimile 20 to the facsimile signal processor 200. The first amplifier 13a in the facsimile signal processor 200 amplifies the facsimile data transmitted from the SLIC 25 in the interface unit 100 and forwards it to the modem 14. The modem 14 receives and modulates the analog facsimile signal and forwards it to the controller 11.

The controller 11 preferably uses the first and second memories 15 and 16 to convert the protocol of the analog facsimile signal received from the modem 14 into the radio data service format/protocol (class 2, 2.0), and forwards the converted signal to the CDMA signal processor 300. The CDMA signal processor 300 receives the facsimile data in the radio data service format (facsimile service protocol, class 2, 2.0) from the facsimile signal processor 200, converts it into a CDMA format, and forwards it to the modulation/demodulation unit 400. The modulation/demodulation unit 400 frequency modulates the facsimile data converted into the CDMA format at the CDMA signal processor 300 into a radio signal.

Next, a method for receiving the facsimile data will be described. The modulation/demodulation unit 400 demodulates an external radio signal and forwards it to the CDMA signal processor 300 in CDMA format. The CDMA signal processor 300 receives the data in CDMA format and converts the data into a radio data service format, and then forwards it to the facsimile signal processor 200. The facsimile signal processor 200 receives the data in the radio data service format (class 2, 2.0) from the CDMA signal processor 300 through the controller 11. It then uses the first and second memories 15 and 16 to convert the data into the analog facsimile protocol, demodulates and amplifies it through the modem 14 and the second amplifier unit 13b, and forwards it to the interface unit 100. The facsimile 20 thus receives a facsimile signal through the interface unit 100.

Figure 2:
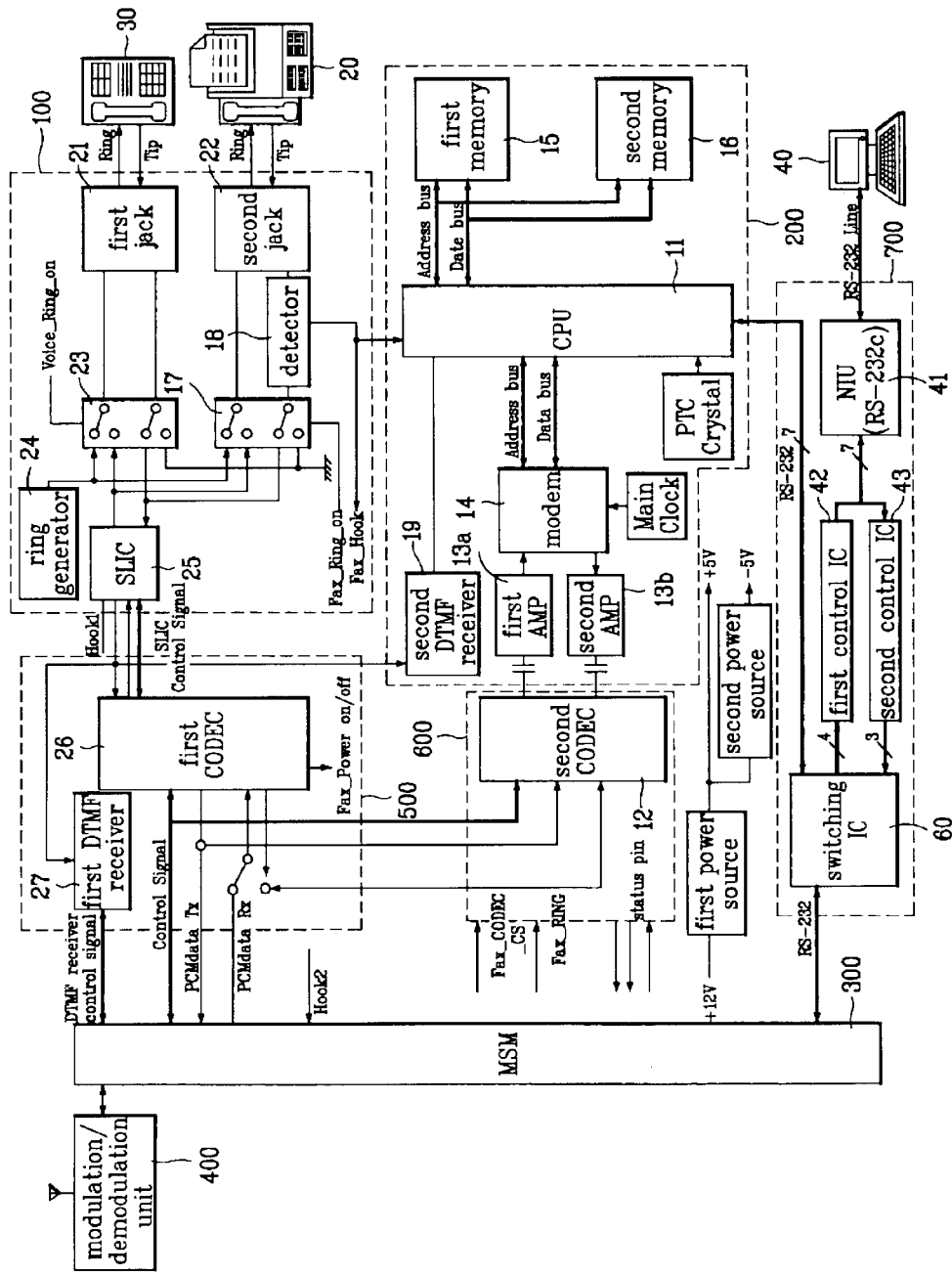

FIG. 2 illustrates a block diagram of a device for transmission/reception of facsimile data in a WLL system according to a second preferred embodiment of the present invention, which permits one to use a domestic telephone set, computer, and facsimile.

Referring to FIG. 2, the device for transmission/reception of facsimile data in a WLL system preferably includes a facsimile unit 20 which can be used, for example, in a home or an office, and an interface unit 100 for transmitting facsimile data generated at the facsimile 20. The device also includes a wire telephone set 30, a computer 40, for matching data received in facsimile protocol to wire line characteristics so as to provide the data to the facsimile 20.

Next, a first CODEC unit 500 converts speech or an analog facsimile data signal from the interface unit 100 into a digital signal, or converts a digital signal into speech or an analog facsimile data signal. It then forwards the signal to the interface unit 100. A second CODEC unit 600 converts the signal converted into the digital signal at the first CODEC unit 500 into an analog signal, or converts the analog signal into a digital signal, which it then forwards to the first CODEC unit 500.

The device further includes a facsimile signal processor 200 for receiving the analog facsimile data from the second CODEC unit 600, converting it into a digital signal and a radio data service format (class 2, 2.0), and forwarding the converted signal. Alternatively, the facsimile signal processor 200 receives data in a radio data service format, converts it into an analog facsimile protocol, and forwards it to the second CODEC 600.

Next, a switching unit 700 switches the computer 40 between the facsimile signal processor 200 and the CDMA signal processor 300. The CDMA signal processor 300 receives the facsimile data converted into the radio data service format from the facsimile signal processor 200 through the switching unit 700 and converts it into a CDMA format. Alternatively, it receives data in a CDMA format, converts it into the radio data format, and forwards it to the facsimile signal processor 200 through the switching unit 700.

The device next includes a modulation/demodulation unit 400 for frequency modulating the facsimile data converted into CDMA format at the CDMA signal processor 300 to forward as a radio signal, or receiving and demodulating an external radio signal, and forwarding it to the CDMA signal processor 300.

The interface unit 100 includes first and second jacks 21 and 22 for connecting the facsimile 20 and the wire telephone set 30 to a NIU, and a ring generator 24 for generating a ring signal if a call is received at the facsimile 20 or the wire telephone set 30. Next, a detector 18 detects and forwards facsimile data transmitted from the facsimile 20, and SLIC 25 holds the use of the facsimile 20 if a call is received at the wire telephone set 30. The SLIC 25 further receives a signal detected at the detector 18, matches line characteristics, and transmits the analog facsimile data produced at the facsimile 20 to the facsimile signal processor 200.

The first CODEC unit 500 includes a first DTMF receiver 27 for receiving a DTMF signal generated at the wire telephone set 30 or the facsimile 20 through the interface unit 100, and forwarding the signal to the CDMA signal processor 300. The unit also includes a first CODEC 26 for receiving the facsimile data from the interface unit 100 and converting it into digital data, or receiving digital data from the second CODEC unit 600, converting it into an analog signal, and forwarding it to the interface unit 100.

The term CODEC is a compound word of "CODER," for converting an analog signal into a digital signal, and conversely, "DECODER," for converting a digital signal into an analog signal, and denotes a modulation/demodulation unit or a code decoder. In general, coding is an operation in which an information source of a continuous signal is transformed (sampled) into a time basis discrete Pulse Amplitude Modulation (PAM) signal, and quantized. This allows the continuous signal to be converted into a binary code ('1' or '0'). An operation in reverse of the foregoing operation is called decoding.

In order to transmit an electric signal as information carried in a network through a digital transmission line or a digital switchboard, which are more economical, an analog signal is preferably converted into a digital signal before transmission or exchange. Thus, the signal is expressed in "1" and "0". Thereafter, the transmitted digital signal should be converted into the original analog signal at the receiver side. Such an operation is called as "coding/decoding" or "analog/digital conversion," or "digital/analog conversion." A device for such conversion is called CODEC.

The facsimile signal processor 200 includes a DTMF receiver 19 for receiving a DTMF generated at the facsimile 20, a first amplifier 13a for amplifying and forwarding the analog facsimile signal from the second CODEC unit 600, and a modem 14 for modulating and forwarding the analog facsimile signal amplified at the first amplifier 13a, or demodulating and forwarding a modulated facsimile signal. It further includes a second amplifier 13b for amplifying the analog facsimile signal demodulated at the modem 14, and forwarding it to the second CODEC unit 600.

The facsimile signal processor 200 also includes a first memory 15, having a radio data service format (protocol, class 2, 2.0) used in a CDMA system and an analog facsimile signal protocol stored therein, and a second memory 16 for buffering the analog facsimile data signal and the CDMA digital facsimile data format signal. Next, and a controller 11 converts the analog facsimile signal from the modem 14 into the radio data digital facsimile signal format (class 2, 2.0) used in a CDMA system, or receives data in a radio data format from the CDMA signal processor 300 and converts the data into the analog facsimile protocol signal. Both conversions of the controller 11 are preferably done by using the first and the second memories 15 and 16. The signal is then forwarded to the second CODEC unit 600 through the modem 14 and the second amplifier 13b. The system also contains a switch 17.

An operation of the device for transmission/reception of facsimile data in a WLL in accordance with a second preferred embodiment of the present invention will be described. A first hook signal hook 1 is generated at the SLIC 25 and is a hook signal for the wire telephone set 30, and a second hook signal hook 2 is generated at the CDMA signal processor 300, and is a hook signal for the facsimile. The G3 facsimile transmission is made at the facsimile 20 by using a radio link through the CDMA signal processor 300.

When the facsimile 20 transmits facsimile data, the detector 18 detects the facsimile data and provides a detection signal to the controller 11 and the SLIC 25. The SLIC 25 matches line characteristics according to the detection signal from the detector 18 to transmit the facsimile data generated at the facsimile 20 to the first CODEC 26 through the first switch 17 and the SLIC 25. The first CODEC 26 converts the facsimile data into a digital signal and forwards it to the second CODEC 12. The second CODEC 12 then converts the digital signal into an analog signal again, and transmits it to the facsimile signal processor 200. The first amplifier 13a in the facsimile signal processor 200 amplifies the facsimile data transmitted from the second CODEC 12 and forwards it to the modem 14. The modem 14 receives and modulates the analog facsimile signal and forwards it to the controller 11.

The controller 11 preferably uses the first and second memories 15 and 16 to convert the protocol of the analog facsimile signal received from the modem 14 into the radio data service format/protocol (class 2, 2.0), and forwards it to the CDMA signal processor 300 through the switching unit 700. The CDMA signal processor 300 receives the facsimile data in the radio data service format (facsimile service protocol, class 2, 2.0) from the facsimile signal processor 200, converts it into a CDMA format, and forwards it to the modulation/demodulation unit 400. The modulation/demodulation unit 400 then modulates the CDMA formatted facsimile data into a radio signal.

When receiving facsimile data, the modulation/demodulation unit 400 demodulates an external radio signal and forwards the radio signal to the CDMA signal processor 300 in CDMA format. The CDMA signal processor 300 receives the CDMA formatted data and converts the data into a radio data service format, and forwards it to the facsimile signal processor 200 through the switching unit 700. The facsimile signal processor 200 receives the radio data service formatted dated from the CDMA signal processor 300 through the controller 11, and preferably uses the first and second memories 15 and 16 to convert the data into the analog facsimile protocol. The facsimile signal processor 200 then amplifies the signal through the modem 14 and the second amplifier unit 13b, and forwards it to the second CODEC unit 600. That is, the controller 11 receives the data in the radio data service format (class 2, 2.0), buffers it at the second memory 16, and uses the analog facsimile protocol stored in the first memory 15 to convert the data into the analog facsimile signal format.

The analog formatted facsimile signal format is demodulated, amplified, and converted into a digital signal as the facsimile signal passes through the modem 14, the second amplifier 13b, and the second CODEC 12. The signal is then forwarded to the first CODEC 26. The first CODEC 26 converts the digital facsimile signal into the analog facsimile signal and forwards it to the facsimile 20 through the interface unit 100. The facsimile 20 receives and forwards the analog facsimile signal format data.

As has been explained, the device for transmission/reception of a facsimile data in a WLL system has several advantages. For example, the transmission of analog data, not directly through a voice channel, but after the analog data is converted into a CDMA digital facsimile data format by providing hardware which can convert the analog data into a radio data service format (class 2, 2.0) permits the transmission/reception of an analog facsimile data connected to NIU in a WLL by using a CDMA system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device for transmission/reception of facsimile data in a Wireless Local Loop (WLL) system, comprising:
   an interface unit, which transmits facsimile data produced at a facsimile or matches data received in an analog facsimile protocol to wire line characteristics to provide the data to the facsimile;
   a facsimile signal processor, which receives the facsimile data from the interface unit, and converts the facsimile data into a digital signal with a radio data service format, or receives data in a radio data service format and converts it into an analog facsimile protocol to forward to the interface unit;
   a CDMA signal processor, which receives the radio data service formatted facsimile data from the facsimile signal processor and converts it into CDMA format, or receives data in CDMA format, converts it into the radio data format and forwards it to the facsimile signal processor; and
   a frequency modulation/demodulation unit, which frequency modulates the CDMA formatted facsimile data to forward as a radio signal, or receives and demodulates an external radio signal, and forwards the received signal to the CDMA signal processor.

2. The device of claim 1, wherein the interface unit comprises:
   a jack to connect the facsimile and a Network Interface Unit (NIU);
   a ring generator to generate a ring signal if a call is received for the facsimile;
   a detector to detect and forward the facsimile data transmitted from the facsimile; and
   an Subscriber Line Integrated Circuit (SLIC) to receive a signal detected at the detector, match line characteristics for transmission of the analog facsimile data generated at the facsimile, and transmit the analog facsimile data to the facsimile signal processor.

3. The device of claim 1, wherein the facsimile signal processor comprises:
   a Dual Tone Multi-Frequency (DTMF) receiver to receive a DTMF generated by the facsimile;
   a first amplifier to amplify and forward the analog facsimile signal from the interface unit;
   a modem to modulate and forward the analog facsimile signal amplified at the first amplifier, or demodulate and forward a modulated facsimile signal;
   a second amplifier to amplify the facsimile signal demodulated at the modem, and forward it to the interface unit;
   a first memory to store a radio data service format and an analog facsimile protocol;
   a second memory to buffer the analog facsimile data signal and the radio data service formatted signal; and
   a controller coupled to the first and second memories to convert the analog facsimile signal received from the modem into a radio data service format, or convert a radio data service format data from the CDMA signal processor into the analog facsimile signal to forward to the modem.

4. The device of claim 1, wherein the radio data service format includes a facsimile service protocol, class 2, 2.0.

5. A device for transmission/reception of a facsimile data in a Wireless Local Loop (WLL) system, comprising:
   an interface unit, which transmits facsimile data generated at a facsimile, or matches data received in a facsimile protocol to wire line characteristics to provide to the facsimile;
   a first CODEC unit, which converts a facsimile data signal from the interface unit into a digital signal, or converts a received digital signal into an analog facsimile data signal to forward to the interface unit;
   a second CODEC unit, which converts the digital signal from the first CODEC unit into an analog signal, or converts an analog facsimile protocol signal into the received digital signal to forward to the first CODEC unit;
   a facsimile signal processor, which receives the analog signal from the second CODEC unit and converts it into a digital signal having a radio data service format, or which receives data in a radio data service format, converts it into the analog facsimile protocol signal, and forwards it to the second CODEC unit;
   a CDMA signal processor, which receives the digital signal having the radio data service format from the facsimile signal processor and converts it into a CDMA format, or which receives data in a CDMA format, converts it into the radio data service format, and forwards it to the facsimile signal processor; and
   a modulation/demodulation unit, which modulates the CDMA formatted signal received from the CDMA signal processor, or which receives and demodulates an external radio signal to forward to the CDMA signal processor.

6. The device of claim 5, wherein the interface unit comprises:

first and second jacks to connect at least one of the facsimile and a wire telephone set to a Network Interface Unit;

a ring generator to generate a ring signal if a call is received at the facsimile or the wire telephone set;

a detector to detect and forward the facsimile data produced at the facsimile; and a Subscriber Line Integrated Circuit to receive a signal detected at the detector, match line characteristics, transmit the facsimile data generated at the facsimile to the first CODEC unit or prevent the use of the facsimile if a call is received at the wire telephone set.

7. The device of claim 5, wherein the first CODEC unit comprises:

a first DTMF receiver to receive through the interface unit a DTMF signal generated at one of the wire telephone set and the facsimile and forward it to the CDMA signal processor; and a first CODEC to receive the facsimile data from the interface unit and convert it into digital data, or receive digital data from the second CODEC unit, convert it into an analog signal, and forward it to the interface unit.

8. The device of claim 5, further comprising a switching unit, which selects one of a computer and the facsimile signal processor to couple to the CDMA signal processor.

9. The device of claim 8, wherein the switching unit comprises:

a connecting unit to connect the computer to a Network Interface Unit;

first and second control circuits to control data transmission and reception between the CDMA signal processor and the computer, and a switching circuit to couple one of the facsimile signal processor and the computer to the CDMA signal processor according to the data communication.

10. A signal processing device, comprising:

an interface unit to couple with at least one input device and detect and receive a device signal or output a device signal;

a first CODEC unit coupled to the interface unit;

a second CODEC unit coupled to the first CODEC unit;

a signal processor coupled to receive a signal from the second CODEC unit and convert a data format of the signal or provide an interface signal to the second CODEC unit; and a Code Division Multiple Access (CDMA) signal processor coupled to receive a processed signal from the signal processor and generate a CDMA formatted signal or receive a CDMA formatted signal and output a radio data formatted signal to the signal processor.

11. The device of claim 10, further comprising a modulating and demodulating unit communicatively coupled to the CDMA signal processor to receive or provide a CDMA formatted signal.

12. The device of claim 10, further comprising:

a switching unit to selectively couple the CDMA signal processor to one of the signal processor and a computer.

13. The device of claim 10, wherein the first CODEC unit converts a signal received from the interface unit from a first format to a second format and converts a signal received from the second CODEC unit from the second format into the first format, and wherein the second CODEC unit converts a signal received from the first CODEC unit from the second format into a third format, and converts a signal received from the signal processor from the third format into the second format.

14. The device of claim 13, wherein the first and third formats are an analog format, and the second format is a digital format.

15. The device of claim 12, wherein the switching unit comprises:

first and second control circuits for controlling data transmission and reception between the CDMA signal processor and a computer, and a switching circuit to selectively couple the CDMA signal processor to one of the signal processor and the computer.

16. The device of claim 15, wherein the switching unit further comprises a network interface unit coupled to the computer and each of the first and second control circuits.

17. The device of claim 15, wherein the signal processor comprises:

a controller coupled to the first and second memories to convert the modulated interface signal received from the modem into a radio data service format, or convert a radio data service format data signal from the CDMA signal processor into the modulated interface signal, and forward it to the modem a second DTMF receiver coupled to receive a control signal from the interface unit;

a modem to modulate and forward the output of the second CODEC unit and demodulate and forward data to the second CODEC;

an amplifier for amplifying the signals to and from the modulator;

a memory to store a radio data service format and an analog facsimile protocol and to buffer signals to be converted by the controller.

18. The device of claim 17, wherein the interface unit comprises:

first and second jacks to couple to first and second input devices;

a ring generator to generate a ring signal if a call is received at the first or second input device;

a detector to detect and forward data from the second input device; and a Subscriber Line Integrated Circuit to receive data from the detector, match line characteristics, and transmit the data to the first CODEC unit.

19. The device of claim 18, wherein the first input device is a wire telephone set and the second input device is a facsimile.

20. The device of claim 10, wherein the signal processor receives an analog facsimile signal and converts it to a digital radio data service format.

21. A method for transmitting facsimile data, comprising:

detecting analog facsimile data from a facsimile;

providing a detection signal to a controller and a Subscriber Line Integrated Circuit (SLIC);

matching line characteristics and the SLIC according to the detection signal;

transmitting the analog facsimile signal to a modem through a first amplifier;

modulating the analog facsimile signal and forwarding it to the controller;

converting the analog facsimile signal to a digital signal using a prescribed protocol;

forwarding the digital signal to a CDMA signal processor;

converting the digital signal into a CDMA protocol; and modulating the CDMA protocol digital signal.

22. A device for transmission/reception of facsimile data in a Wireless Local Loop (WLL) system, comprising:

an interface unit to transmit facsimile data produced at a facsimile;

a facsimile signal processor to receive the facsimile data from the interface unit and to convert the facsimile data into a digital signal with a radio data service format;

a CDMA signal processor to receive the radio data service formatted facsimile data from the facsimile signal processor and to convert it into CDMA format; and a frequency unit to frequency modulate the CDMA formatted facsimile data to forward as a radio signal.

23. The device of claim 22, wherein the interface unit further to match data received in an analog facsimile protocol to wire line characteristics and to provide the data to the facsimile.

24. The device of claim 3, wherein the interface unit comprises:

a jack to connect the facsimile and a Network Interface Unit (NIU);

a ring generator to generate a ring signal if a call is received for the facsimile;

a detector to detect and forward the facsimile data transmitted from the facsimile; and an Subscriber Line Integrated Circuit (SLIC) to receive a signal detected at the detector, match line characteristics for transmission of the analog facsimile data generated at the facsimile, and transmit the analog facsimile data to the facsimile signal processor.

25. The device of claim 22, wherein the facsimile signal processor further to receive data in the radio data service format and convert it into an analog facsimile protocol to forward to the interface unit.

26. The device of claim 25, wherein the facsimile signal processor comprises:

a Dual Tone Multi-Frequency (DTMF) receiver to receive a DTMF generated by the facsimile;

a first amplifier to amplify and forward the analog facsimile signal from the interface unit;

a modem to modulate and forward the analog facsimile signal amplified at the first amplifier, or demodulate and forward a modulated facsimile signal;

a second amplifier to amplify the facsimile signal demodulated at the modem, and forward it to the interface unit;

a first memory to store a radio data service format and an analog facsimile protocol;

a second memory to buffer the analog facsimile data signal and the radio data service formatted signal; and a controller coupled to the first and second memories to convert the analog facsimile signal received from the modem into a radio data service format, or convert a radio data service format data from the CDMA signal processor into the analog facsimile signal to forward to the modem.

27. The device of claim 22, wherein the CDMA signal processor further to receive data in CDMA format and convert it into the radio data format.

28. The device of claim 22, wherein the frequency unit further to frequency demodulate an external radio signal.

29. A device for transmission/reception of facsimile data in a Wireless Local Loop (WLL) system, comprising:

an interface unit to match data received in an analog facsimile protocol to wire line characteristics and to provide the data to a facsimile;

a facsimile signal processor to receive data in a radio data service format and convert it into an analog facsimile protocol to forward to the interface unit;

a CDMA signal processor to receive data in CDMA format, converts it into the radio data format and forwards it to the facsimile signal processor; and a frequency unit to receive and demodulate an external radio signal, and forward the received signal to the CDMA signal processor.

30. The device of claim 29, wherein the interface unit further to transmit facsimile data produced at a facsimile.

31. The device of claim 29, wherein the facsimile signal processor further to receive the facsimile data from the interface unit and convert the facsimile data into a digital signal with the radio data service format.

32. The device of claim 29, wherein the CDMA signal processor further to receive the radio data service formatted facsimile data from the facsimile signal processor and convert it into CDMA format.

33. The device of claim 29, wherein the frequency unit further to frequency modulate the CDMA formatted facsimile data to forward as a radio signal.

34. The signal processing device of claim 10, wherein the interface unit comprises:

first and second jacks to connect at least one of the facsimile and a wire telephone set to a Network Interface Unit;

a ring generator to generate a ring signal if a call is received at the facsimile or the wire telephone set;

a detector to detect and forward the facsimile data produced at the facsimile; and a Subscriber Line Integrated Circuit to receive a signal detected at the detector, match line characteristics, transmit the facsimile data generated at the facsimile to the first CODEC unit or prevent the use of the facsimile if a call is received at the wire telephone set.

35. The signal processing device of claim 10, wherein the first CODEC unit comprises:

a first DTMF receiver to receive through the interface unit a DTMF signal generated at one of the wire telephone set and the facsimile and forward it to the CDMA signal processor; and a first CODEC to receive the facsimile data from the interface unit and convert it into digital data, or receive digital data from the second CODEC unit, convert it into an analog signal, and forward it to the interface unit.

* * * * *